Patented Dec. 9, 1941

2,265,271

UNITED STATES PATENT OFFICE 2,265,271

PHOSPHOGLUCONATE OF IRON

Sarto Desnoyers, Montreal, Quebec, Canada

No Drawing. Application October 7, 1940,
Serial No. 360,114

4 Claims. (Cl. 260—439)

The present invention pertains to a novel compound of iron intended for internal medicinal use and having certain advantages over existing iron compounds for the same purpose. One of the more important objects of the invention is to obtain an iron salt that remains stable in the ferrous state. The novel compound according to this invention may also be suitable for industrial and commercial purposes where the above mentioned property is desirable.

The new compound is a phospho-gluconate of iron and is characterized by containing the gluconic acid radical, preferably in the ratio of six to two atoms of phosphorus and three molecules of iron.

Various methods may be employed for producing the compound in the sense that various reagents may be used to provide the necessary organic radical groups and the molecules of iron and phosphorus. The reagents are thoroughly mixed, and in some cases the reaction is favored by application of heat.

The invention will now be described more particularly with reference to the process of production. Various combinations of reagents and the treatment thereof, all of which produce the novel phospho-gluconate of iron, may be enumerated as follows:

1. Mixing reduced iron with gluconic acid and phosphoric acid in combining weights and assisting the reaction by agitation and heat.

2. Mixing ferrous or ferric carbonate with a mixture of phosphoric and gluconic acid in combining weights.

3. Mixing iron oxide with combining weights of phosphoric and gluconic acids.

4. Mixing ferrous or ferric chloride or any other ferrous or ferric salt, capable of releasing its iron by chemical or physical means, with phosphoric and gluconic acids in combining weights.

5. Adding calcium gluconate and phosphate of iron to obtain a double decomposition. The calcium phosphate is precipitated and the phosphogluconate remains in solution.

6. Obtaining an oxidation product of glucose by chemical or physical means and adding thereto iron and phosphoric acid or its salts.

7. Adding phosphoric acid to gluconic acid and iron.

8. Combining iron and gluconic acid and adding phosphoric anhydride.

9. Combining phosphoric acid with iron or an iron salt and adding gluconic acid.

10. Combining phosphoric acid with iron or a salt thereof and gluconic acid with iron or a salt thereof and then combining the two resultant products in solution and favoring the reaction by desiccation.

11. Oxidizing glucose by physical or chemical means and adding iron or a salt thereof with phosphoric anhydride.

The phospho-gluconate of iron obtained by any of the foregoing methods has the formula $C_{36}H_{60}O_{44}P_2Fe_3$, represented structurally as follows:

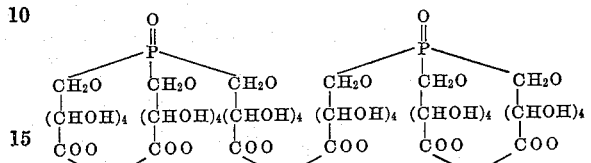

It is a crystalline powder, gray-green in color, very soluble in water and water-alcohol solution, slightly soluble in alcohol, insoluble in oils, and soluble in oily bodies. It is slightly astringent and resembles somewhat the taste of caramel (burnt sugar).

It has the chemical characteristics of ferrous salts and very slightly those of ferric salts.

According to the process employed, the product obtained may be a ferrous mono-phospho-gluconate or a ferrous poly-phospho-gluconate, and the proportion of iron may vary from twelve percent to twenty percent metallic iron. The phosphorus must not be less than four percent or exceed ten percent.

Ferrous phospho-gluconate has shown itself to be much more stable than ferrous carbonate and ferrous phosphate, but the principal advantages are as follows:

1. The anti-anemia power is three to four times that of ferrous carbonate by weight.

2. It is less astringent than the chloride, sulfate or peptonate, and it does not cause the digestive disturbances common to iron salts.

3. Since the iron thus combined is more readily utilized and absorbed, it is not necessary to take such a large dose as in the case of reduced iron or iron carbonate.

Although specific illustrations have been given, it will be understood that variations are possible within the range of equivalents and within the scope of the invention as indicated by the appended claims.

What I claim is:

1. A salt consisting of the phosphoric and gluconic acid radicals chemically combined with iron.

2. A salt consisting of the phosphoric and gluconic acid radicals chemically combined with iron in the ferrous state.

3. Phospho-gluconate of iron having the structural formula
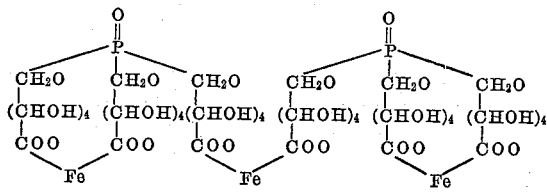
4. A salt consisting of the phosphoric and gluconic acid radicals chemically combined with iron, in the ratio of 2 atoms of phosphorus, 6 molecules of the gluconic compound, and 3 molecules of iron.
SARTO DESNOYERS.